US000001327H

United States Statutory Invention Registration [19]

[11] Reg. Number: H1327

Moir et al.

[43] Published: Jul. 5, 1994

[54] METHOD FOR PURIFYING AMINE GAS SWEETENING SYSTEMS BY ADDITION OF $CO_2$

[75] Inventors: Michael E. Moir; William A. Rendall, both of Calgary, Canada

[73] Assignee: Exxon Production Research Company, Houston, Tex.

[21] Appl. No.: 587,703

[22] Filed: Sep. 25, 1990

[30] Foreign Application Priority Data

Sep. 29, 1989 [CA] Canada ..... 614910

[51] Int. Cl.[5] ..... B01D 53/34

[52] U.S. Cl. ..... 423/228

[58] Field of Search ..... 423/242 R, 243, 228, 423/573.1, 215.5, 575

[56] References Cited

U.S. PATENT DOCUMENTS

| | | | |
|---|---|---|---|
| 3,516,793 | 5/1970 | Renault | 423/573.1 |
| 3,545,916 | 12/1970 | Deicher et al. | 423/243 |
| 3,826,811 | 7/1974 | Hakka | 423/243 |
| 4,033,410 | 7/1977 | Kauffman | 423/228 |
| 4,152,217 | 5/1979 | Eisenberg et al. | 203/2 |
| 4,240,923 | 12/1980 | Sartori et al. | 252/189 |
| 4,259,301 | 3/1981 | Say | 423/228 |
| 4,282,193 | 8/1981 | Melchior et al. | 423/223 |
| 4,299,801 | 11/1981 | Lynn et al. | 423/288 |
| 4,543,193 | 9/1985 | Peter et al. | 423/243 |
| 4,581,209 | 4/1986 | Oswald et al. | 423/223 |

OTHER PUBLICATIONS

N. P. Liebermann, "Amine Appearance Signals Condition of System", Oil and Gas Journal, May 12, 1980, pp. 115–120.

Wiechert, S., et al., "Commercialization of Flexsorb ®PS Gas Treating Agent", AIChE Spring National Meeting, New Orleans, Apr. 6–10, 1986.

Goldstein, A. M., et al., "New Flexsorb Gas Treating Technology for Acid Gas Removal", Energy Progress (vol. 6, No. 2), Jun. 1986, pp. 67–70.

Chludzinski, G. R., "Recent Commercial Tests of Flexorb ®PS Solvent", Houston Regional Gas Processors Association Meeting, Nov. 7, 1985.

Gagliardi, C. R., et al., "Strategies to Improve MEA $CO_2$–Removal Detailed at Louisiana Ammonia Plant", Oil & Gas Journal, Mar. 6, 1989, pp. 44–49.

*Primary Examiner*—Robert L. Stoll

*Assistant Examiner*—Joseph D. Anthony

[57] ABSTRACT

A method for removing dissolved solids or sludge from amine absorbing solutions for acidic gas in gas sweetening systems is provided comprising contacting a stream of regenerated absorbing solution with $CO_2$ such that the sludge forms a precipitate and removing the precipitate from the absorbing solution. The stream of absorbing solution may then be returned to a regenerator for removal of $CO_2$ or returned to the gas sweetening system with the regenerated absorbing solution.

15 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PURIFYING AMINE GAS SWEETENING SYSTEMS BY ADDITION OF $CO_2$

BACKGROUND OF THE INVENTION

1. Field of the Invention

The present invention relates generally to removing impurities from amine absorbing solutions for acidic gas in gas sweetening systems. More specifically, the present invention provides a method for removing sludge from amine absorbing solutions by contacting a stream of regenerated absorbing solution with $CO_2$.

2. Description of the Prior Art

It is well known in the art to treat gases and liquids with amine absorbing solutions to remove acidic gases such as $CO_2$ and $H_2S$. The amine usually contacts the acidic gases and liquids as an aqueous solution containing amine in an absorber tower with the aqueous amine solution contacting the acidic fluid countercurrently.

The acid gas scrubbing processes known in the art can be generally broken into three (3) categories.

The first category is generally referred to as the aqueous amine process where relatively concentrated amine solutions are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressure of the $CO_2$ and other gases are low.

A second category is generally referred to as the aqueous base scrubbing process or "hot pot" process. In this type of process, a small level of an amine is included as an activator for the aqueous base used in the scrubbing solution. This type of process is generally used where bulk removal of an acid gas, such as $CO_2$, is required. This process also applies to situations where the $CO_2$ and feed gas pressures are high. In such processes, useful results are achieved using aqueous potassium carbonate solutions and an amine activator.

A third category is generally referred to as the nonaqueous solvent process. In this process, water is a minor constituent of the scrubbing solution and the amine is dissolved in the liquid phase containing the solvent. In this process, up to 50% of the amine is dissolved in the liquid phase. This type of process is utilized for specialized applications where the partial pressure of $CO_2$ is extremely high and/or where many acid gases are present, e.g., COS, $CH_3SH$ and $CS_2$.

In the known absorption operations, the enriched absorbent or solvent, after being withdrawn from the absorber column, is passed into a regenerator column where the absorbed $H_2S$ and/or $CO_2$ are stripped by countercurrent contacting with steam. The steam is generated at the bottom of the regenerator column by boiling the solution in an indirectly heated tubular heat exchanger or "reboiler". The heat for this boiling may come from steam, or from any hot fluid, or from direct firing. The countercurrent contacting with steam in the regenerator column, followed by boiling, will strip the $H_2S$ and or $CO_2$ from the solution down to a very low residual level. The hot stripped solution, known as "lean solution", or regenerated absorbing solution, is withdrawn from the reboiler, cooled, and sent back to the absorber column to complete the cycle of absorption and regeneration.

It has been found, however, that acid gas absorbing solutions can react with elemental sulfur to form dissolved solids (sludge) at temperatures normally found in gas plants. Unless elemental sulfur can be excluded from the system, the sludge will be a permanent feature of gas treatment with amine absorbing solutions. Filtering the sludge from absorbing solution that is heavily loaded with $H_2S$ (rich absorbing solution) is hazardous. Consequently, there exists a need for an alternative method to remove sludge from acid gas absorbing solutions in gas sweetening systems.

SUMMARY OF THE INVENTION

The aforementioned need relating to removal of sludge from acidic gas absorbing solutions used in gas sweetening systems can be provided for in accordance with the present invention. This invention relates to a method for removing sludge from a lean absorbing solution in a gas sweetening system. More specifically, in a gas sweetening system wherein acidic gas components are removed from gas by an absorbing solution, a process is provided for removing sludge from the absorbing solution by:

(a) contacting a stream of regenerated absorbing solution with $CO_2$ such that the sludge forms a precipitate, and (b) removing said precipitate from the stream of absorbing solution.

In a preferred embodiment of the invention, the stream of regenerated absorbing solution comprises from about 0.001 to about 10 percent of the absorbing solution in the gas sweetening system. In an even more preferred embodiment the stream comprises from about 0.001 to about 1 percent of the absorbing solution in the system.

DESCRIPTION OF THE PREFERRED EMBODIMENTS

The term "acidic gases" is meant to include $CO_2$, $H_2S$, $SO_2$, $SO_3$, $CS_2$, HCN, COS and the oxygen and sulfur derivatives of $C_1$ to $C_4$ hydrocarbons in various amounts as they frequently appear in gaseous mixtures. These acidic gases, which are generally $CO_2$ and $H_2S$, may be present in trace amounts within a gaseous mixture or in major proportions.

Figure 1:
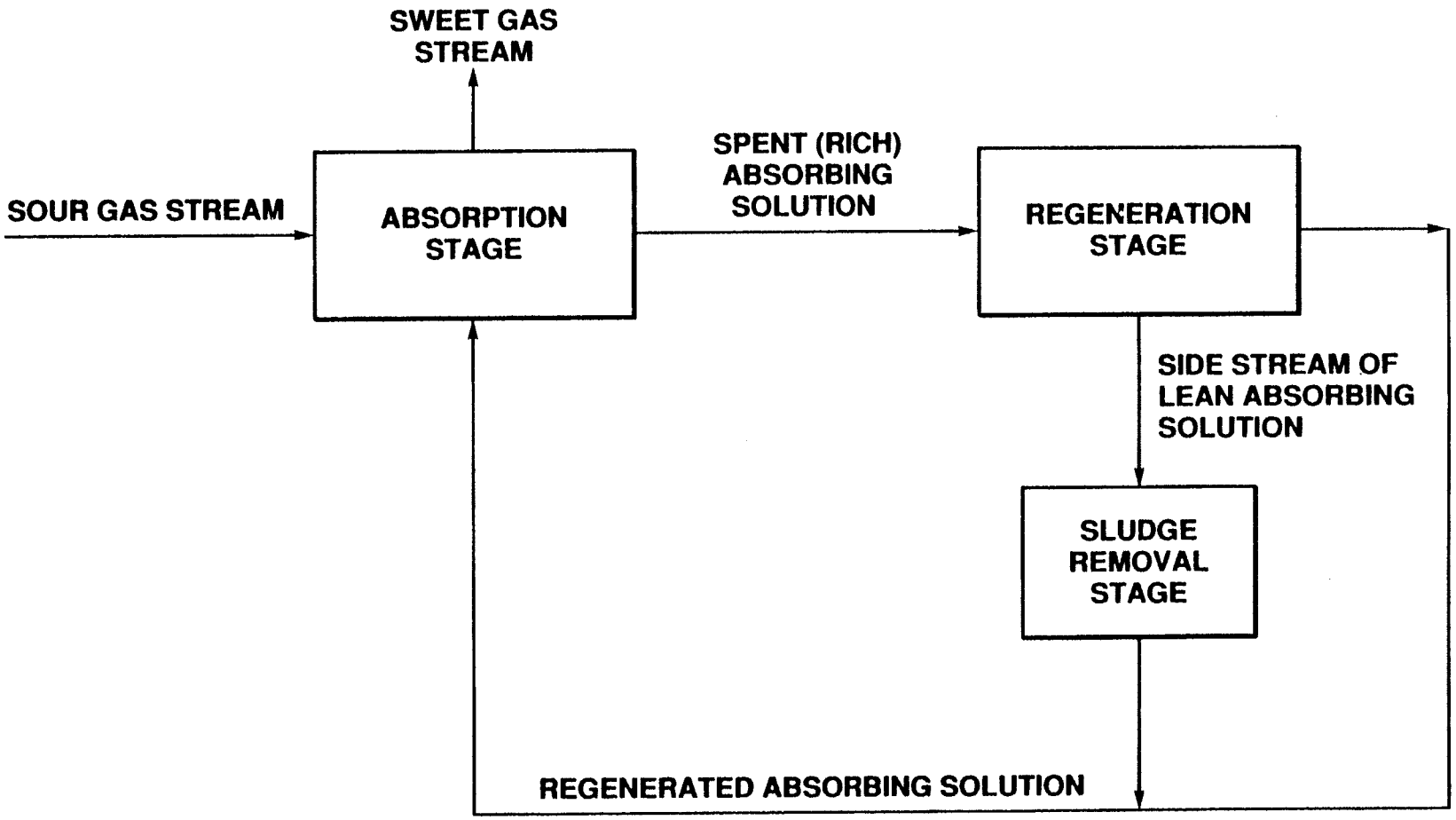
FIG. 1 is a flow diagram of the basic method of this invention.

Referring to the block diagram in FIG. 1, in accordance with the present invention an acidic gas containing gas stream enters an absorption stage where acid gas contaminants are absorbed into an amine absorbing solution. The contacting of the amine absorbing solution and the acidic gases may take place in any suitable contacting tower. In such processes, the normally gaseous mixture from which the acidic gases are to be removed may be brought into intimate contact with the absorbing solution using conventional means, such as a tower packed with, for example, ceramic rings or saddles or with bubble cap plates or sieve plates, or a bubble reactor.

The absorption step may be conducted by feeding the normally gaseous feed into the base of the tower while fresh and/or regenerated absorbing solution is fed into the top. The normally gaseous mixture freed largely from $CO_2$-containing acidic gases emerges from the top.

The contacting takes place under conditions such that the acidic gases, e.g., $CO_2$ possibly in combination with $H_2S$ and/or COS are absorbed by the solution. During the absorption the solution is maintained in a single phase.

The absorbing solution which is saturated or partially saturated with acid gases, such as $CO_2$ and $H_2S$ may be regenerated so that it may be recycled back to the absorber. The regeneration should also take place in a single liquid phase. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower.

Amine absorbing solutions may react with elemental sulfur from the $H_2S$-containing gas to form dissolved solids or sludge. This sludge is not effectively removed by known regeneration processes and will build up in time until the absorbing solution is no longer useable.

According to the present invention, a side stream of lean absorbing solution that is from about 0.001 to about 10%, and preferably from about 0.001 to about 1%, of the total solution in the system is treated with $CO_2$ gas such that the sludge precipitates. The precipitate is then removed by filtration or centrifugation. The $CO_2$-rich gas stream may then be returned to the regenerator for removal of $CO_2$. Alternatively, it may be returned to the contactor with the main circulating solution since the very small volume of $CO_2$-loaded solution will not significantly reduce gas absorption capacity.

The process of the invention eliminates the need for a reclaiming step wherein the amine absorbing solution is purified by use of a stream-driven distillation process.

The process of this invention will not eliminate sludge from a system entirely once the sludge is present, but it will maintain the amount of sludge at a fairly constant level by removing it at the same rate as it forms, removing it as it forms.

Particular amine absorbing solutions useful in the process of this invention are those containing sterically hindered amines with a solvent as disclosed in U.S. Pat. No. 4,240,923 to Sartori et al. Accordingly, the process of this invention is particularly useful for amine absorbing solutions containing 2-piperidine ethanol and sulfolane and which also may contain water.

Figure 2:
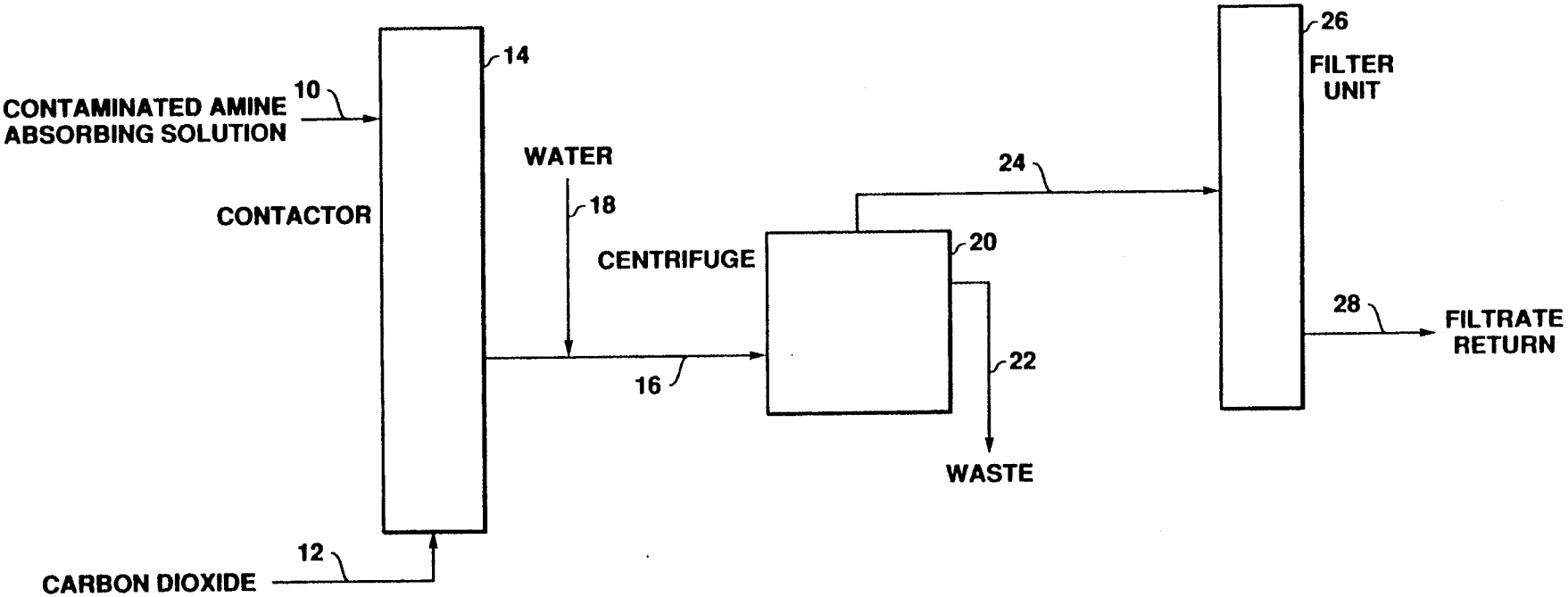
FIG. 2 is a schematic representation of the steps of a preferred embodiment of the process of this invention.

Referring to the preferred embodiment shown in FIG. 2, a sidestream of lean, sludge-containing absorbing solution is treated with $CO_2$ gas in a conventional gas/liquid contactor. The side stream of absorbing solution comprises from about 0.001 to about 1 percent of the total absorbing solution in the system. The absorbing solution enters contactor 14 from the top through line 10 and $CO_2$ is injected into the bottom through line 12. The treated solution is discharged through line 16 and may then be diluted with water from line 18 to agglomerate sludge precipitate for more efficient removal. The solution may then be passed to centrifuge 20 or through filter unit 26 or both. Precipitate is discharged through line 22. Sludge-free absorbing solution is passed through line 28 either back to the regenerator or directly back to the main circulation stream as shown in FIG. 1.

The preferred embodiments of the present invention have been described above. It should be understood that the foregoing description is intended only to illustrate certain preferred embodiments of the invention and is not intended to define the invention in any way. Other embodiments of the invention can be employed without departing from the full scope of the invention as set forth in the appended claims.

The embodiments of the invention in which an exclusive property or privilege is claimed are defined as follows:

1. In a gas sweetening system which acid gas is removed from gas by an acid gas absorbing solution comprising amine, a process for removing sludge, formed as a reaction product of said absorbing solution and elemental sulfur, from said absorbing solution comprising:

(a) contacting a stream generated absorbing solution with $CO_2$ such that said sludge forms a precipitate; and (b) removing precipitate from said stream of absorbing solution.

2. A process in accordance with claim 1 wherein said absorbing solution comprises a sterically hindered amine and a solvent.

3. A process in accordance with claim 2 wherein said absorbing solution comprises 2-piperidine ethanol and sulfolane.

4. A process in accordance with claim 3 wherein said absorbing solution further comprises water.

5. A process in accordance with claim 1 wherein said regenerated stream of absorbing solution comprises from about 0.001 to about 10 percent of said absorbing solution in said gas sweetening system.

6. A process in accordance with claim 1 wherein said stream of regenerated absorbing solution comprises from about 0.001 to about 1 percent of said absorbing solution in said gas sweetening system.

7. A process in accordance with claim 1 wherein said stream of regenerated absorbing solution is contacted with $CO_2$ in a gas/liquid contactor.

8. A process in accordance with claim 1 wherein said stream of regenerated absorbing solution is diluted with water after contacting with $CO_2$ to enhance removal of said precipitate.

9. A process in accordance with claim 1 wherein said precipitate is removed by filtration.

10. A process in accordance with claim 9 wherein said filtration is carried out with in-line cartridge filters.

11. A process in accordance with claim 1 wherein said precipitate is removed by centrifugation.

12. A process in accordance with claim 1 wherein said stream of absorbing solution is further returned to a regenerator for removal of $CO_2$.

13. A process in accordance with claim 1 wherein said stream of absorbing solution is further returned to said gas sweetening system with the regenerated absorbing solution.

14. In a gas sweetening system wherein $CO_2$ and $H_2S$ are removed from gas by an absorbing solution comprising a sterically hindered amine and a solvent, a process for removing sludge from said absorbing solution comprising:

(a) contacting a stream of regenerated absorbing solution, wherein said stream comprises from about 0.001 to about 10 percent of said absorbing solution in said gas sweetening system, with $CO_2$ such that said sludge forms a precipitate; and (b) removing said precipitate from said stream of absorbing solution.

15. In a gas sweetening system wherein $CO_2$ and $H_2S$ are removed from gas by an amine absorbing solution comprising 2-piperidine ethanol, sulfolane and water, a process for removing sludge from said absorbing solution comprising:

(a) contacting a stream of regenerated absorbing solution, wherein said stream comprises from about 0.001 to about 1 percent of said absorbing solution in said gas sweetening system, with $CO_2$ such that said sludge forms a precipitate;

(b) diluting said stream of absorbing solution with water; and (c) removing said precipitate from said stream of absorbing solution by filtration.

* * * * *